(12) United States Patent
Kim et al.

(10) Patent No.: US 9,301,084 B2
(45) Date of Patent: Mar. 29, 2016

(54) HOME APPLIANCE AND CONTROL METHOD THEREOF

(71) Applicant: LG Electronics Inc., Seoul (KR)

(72) Inventors: Yanghwan Kim, Changwon-si (KR); Minyoung Park, Changwon-si (KR)

(73) Assignee: LG ELECTRONICS INC., Seoul (KR)

( * ) Notice: Subject to any disclaimer, the term of this patent is extended or adjusted under 35 U.S.C. 154(b) by 161 days.

(21) Appl. No.: 14/107,639

(22) Filed: Dec. 16, 2013

(65) Prior Publication Data

US 2014/0192678 A1 Jul. 10, 2014

(30) Foreign Application Priority Data

Jan. 7, 2013 (KR) .......................... 10-2013-0001763

(51) Int. Cl.
*H04W 4/00* (2009.01)
*H04L 12/24* (2006.01)

(52) U.S. Cl.
CPC ........... *H04W 4/008* (2013.01); *H04L 41/0846* (2013.01)

(58) Field of Classification Search
CPC .......... H04W 4/008; H04L 2012/2841; H04L 41/0846
See application file for complete search history.

(56) References Cited

U.S. PATENT DOCUMENTS

| 2011/0070825 A1* | 3/2011 | Griffin et al. ................. 455/41.1 |
| 2011/0122434 A1* | 5/2011 | Kim ............................. 358/1.15 |
| 2013/0215467 A1* | 8/2013 | Fein et al. .................... 358/1.15 |
| 2013/0223287 A1* | 8/2013 | Ahmad ......................... 370/255 |

* cited by examiner

*Primary Examiner* — Pao Sinkantarakorn
(74) *Attorney, Agent, or Firm* — Dentons US LLP

(57) ABSTRACT

A home appliance includes a first module to communicate with a communication module of a terminal; a second module to communicate with a router; and a control unit controlling a communication connection between the second module and the router by using information stored in the first module. The first module includes a module recognition unit recognizing whether the communication module of the terminal is within a preset distance; and a memory unit storing network configuration information to be used when the second module accesses the router.

16 Claims, 6 Drawing Sheets

HOME APPLIANCE AND CONTROL METHOD THEREOF

CROSS-REFERENCE TO RELATED APPLICATIONS

The present application claims priority under 35 U.S.C. 119 and 35 U.S.C. 365 to Korean Patent Application No. 10-2013-0001763 (filed on Jan. 7, 2013), which is hereby incorporated by reference in its entirety.

BACKGROUND

Generally, home appliances include washing machines, refrigerators, cooking devices, cleaners, and etc.

In the case of typical home appliances, remote controls or portable terminals have been used to remotely control the operation of the home appliances.

Korean patent application No. 10-2004-0080033 previously filed by the applicant sets forth a remote control device and method that may control home appliances in a remote place by using portable terminals.

The prior application sets forth a technology that in a remote control mode to control devices in a remote place, portable terminals output remote control signals for corresponding home appliances to be controlled, the remote control signals output from the portable terminals are amplified to certain levels by a relay and transmitted to the corresponding home appliances, and thus it is possible to remotely control home appliances by using the portable terminals.

According to the prior application, there is a need for a relay to communicate with the portable terminals. Also, communication between devices in a remote control process may fail. That is, there is a decrease in communication reliability.

SUMMARY

Embodiments provide a home appliance controllable by using a portable terminal.

In one embodiment, a home appliance includes a first module to communicate with a communication module of a terminal; a second module to communicate with a router; and a control unit controlling a communication connection between the second module and the router by using information stored in the first module, wherein the first module includes a module recognition unit recognizing whether the communication module of the terminal is within a preset distance; and a memory unit storing network configuration information to be used when the second module accesses the router.

In another embodiment, a method of controlling a home appliance includes executing an application of a home appliance and executing a network configuration mode of near field communication (NFC); tagging the terminal to the home appliance for data transmission or reception; writing, by the terminal, network configuration information to a first module of the home appliance if the tagging is performed, and reading, by a control unit of the home appliance, the network configuration information from the first module; and transmitting, by the control unit of the home appliance, the network configuration information read from the first module, to a router.

The details of one or more embodiments are set forth in the accompanying drawings and the description below. Other features will be apparent from the description and drawings, and from the claims.

DETAILED DESCRIPTION OF THE EMBODIMENTS

Particular embodiments of the present invention are described below with reference to the drawings. However, the spirit of the present invention is not limited to the embodiments to be presented and an ordinary person skilled in the art will be able to propose other embodiments within the same spirit as the present invention.

Figure 1:
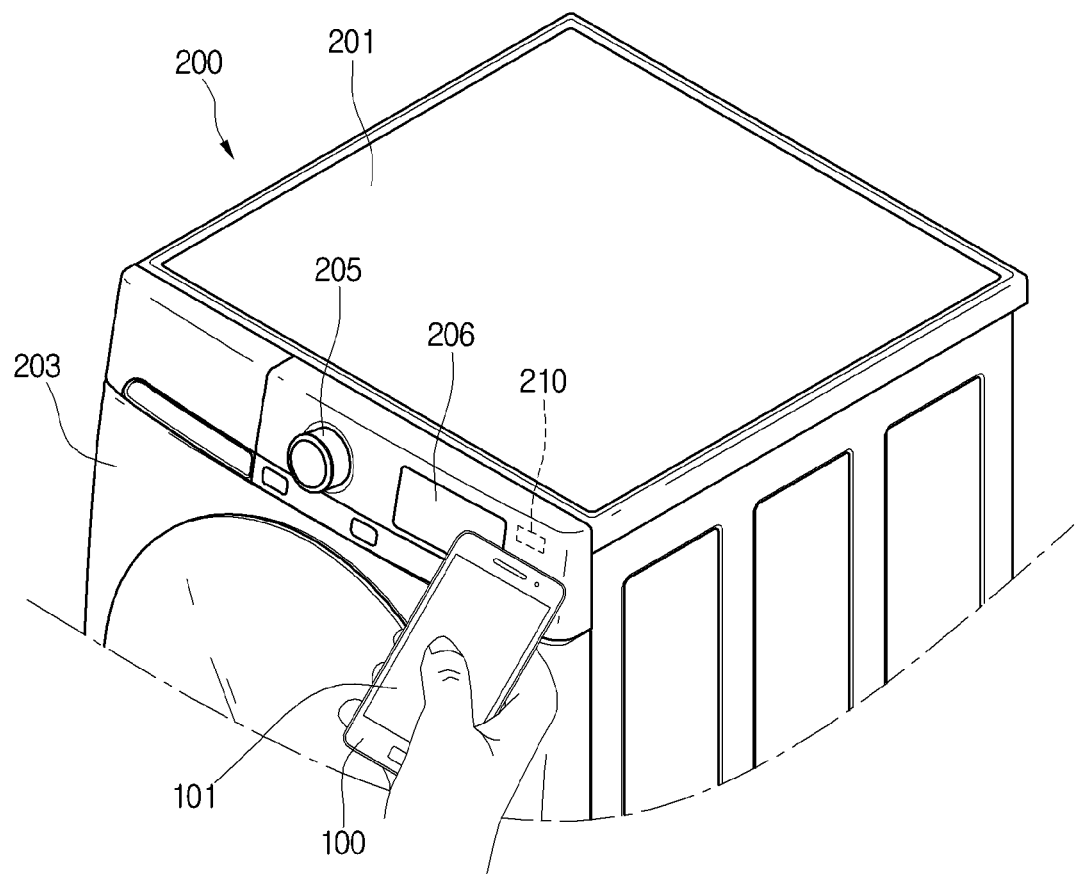
FIG. 1 is a perspective view of a home appliance and a terminal according to an embodiment of the present invention.
Figure 2:
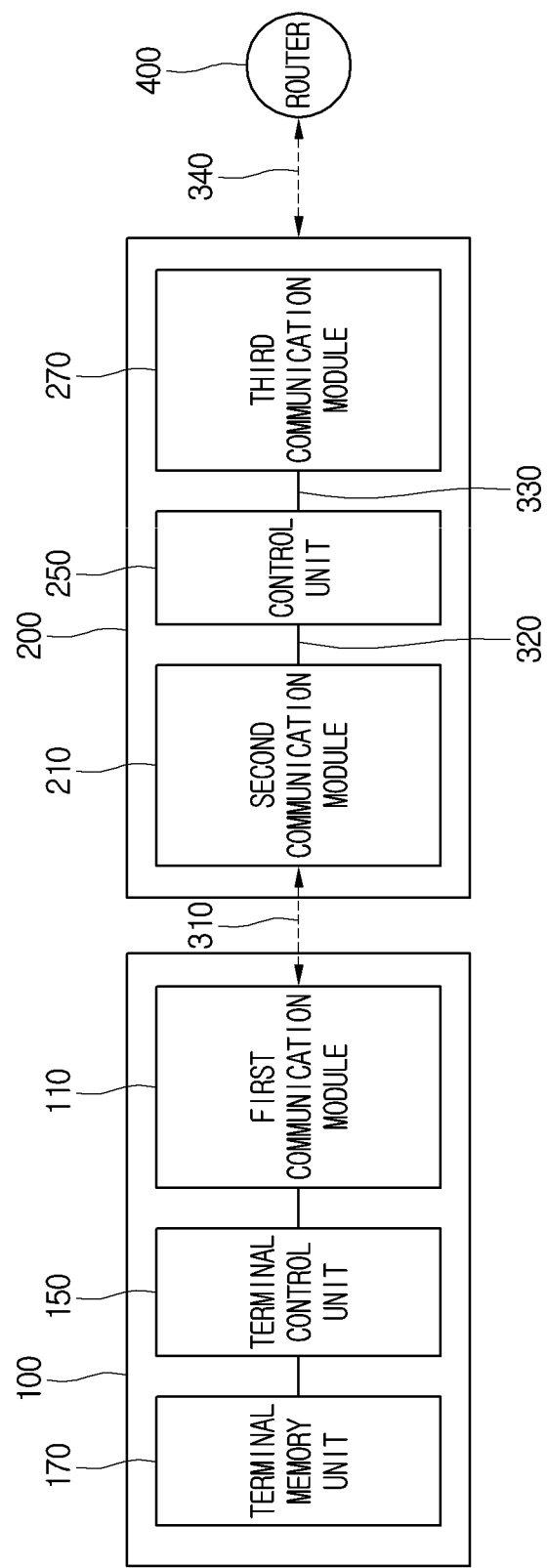
FIG. 2 is a block diagram of a home appliance and a terminal according to an embodiment of the present invention.
Figure 3:
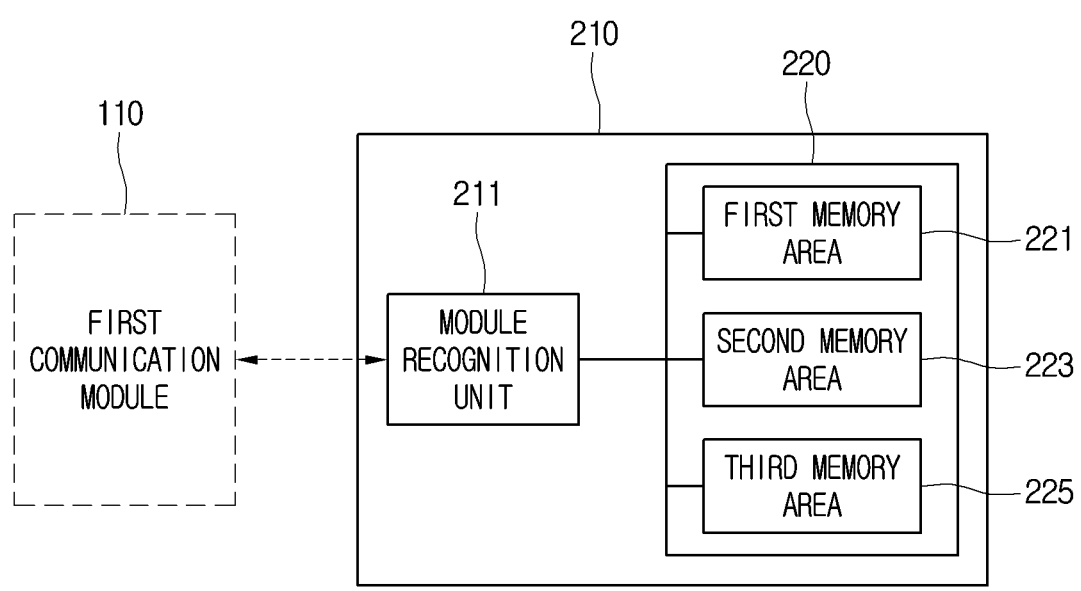
FIG. 3 is a block diagram of a communication module of a home appliance according to an embodiment of the present invention.

FIG. 1 is a perspective view of a home appliance and a terminal according to an embodiment of the present invention, FIG. 2 is a block diagram of a home appliance and a terminal according to an embodiment of the present invention, and FIG. 3 is a block diagram of a communication module of a home appliance according to an embodiment of the present invention.

Referring to FIGS. 1 to 3, a network system according to an embodiment of the present invention includes a terminal 100, a home appliance 200, and a router 400. The terminal 100 is connected to the home appliance to be able to communicate with each other. Although FIG. 1 shows a washing machine as an example of the home appliance, the home appliance is not limited thereto.

The terminal 100 includes a first communication module 110, which is provided to be able to communicate with the home appliance 200, and a terminal display unit 101.

The home appliance 200 includes a body 201, an input unit 205, a display unit 206, and a second communication module 210 that may communicate with the first communication module 110. As an example, the input unit 205, the display unit 206, and the second communication module 210 may be placed on the front surface 203 of the home appliance 201.

An operating condition for operating the home appliance 200 may be inputted through the input unit 205, and information on the operation of the home appliance 200 may be displayed on the display unit 206.

The terminal 100 further includes a terminal memory unit 170 that stores information on certain programs, for example, applications for performing communication with the home appliance 200, for example, information, and a terminal control unit 150 that controls the terminal memory unit 170 and the first communication module 110.

The home appliance 200 further includes a third communication module 270, such as a WiFi modem, which is provided to be able to communicate with the router 400, and a control unit 250 that controls the second communication module 210 and the third communication module 270. For convenience of description, the second communication module 210 may be referred to as a "first module" of the home appliance and the third communication module 270 may be referred to as a "second module" of the home appliance.

The router 400 may be an access point (AP) for configuring WiFi. Certain access information is needed in order to connect with the router 400. The access information includes the identification (ID), communication security mechanism and password of the router 400.

In addition, the communication security mechanism includes a wired equivalent privacy (WEP) mechanism, a WiFi protected access (WPA) mechanism, or a WPA2 mechanism.

The control unit 250 may write inside information on the home appliance to the second communication module 210 (a writing function) or read stored inside information from the second communication module 210 (a reading function).

Here, the inside information on the home appliance may be understood as information that is generated in the home appliance while driving the home appliance. As an example, the inside information on the home appliance may include operation error information on the home appliance.

In addition, the inside information on the home appliance is information required for operating the home appliance and may be understood as information generated outside of the home appliance, namely, information transmitted from the terminal 100. As an example, the inside information may include information on the communication of the home appliance.

A first interface 310 may be determined as a communication mechanism between the first communication module 110 and the second communication module 210. As an example, the first interface 310 includes a near field communication (NFC) mechanism.

The NFC is one of radio frequency identification (RFID) technologies, which is a contactless communication technology using a specific frequency band (13.56 MHz). The NFC has advantages of relatively excellent security and low cost because the communication distance between devices is short.

Thus, the first communication module 110 and the second communication module 210 may be understood as communication modules for performing an NFC function and have the same configuration. The second communication module 210 is referred to below as an "NFC module" for convenience of description.

If the terminal 100 moves to be within a preset distance from the home appliance 200 and tags the home appliance 200, namely, if the first communication module 110 is within a preset distance from the second communication module 210, communication between the terminal 100 and the home appliance 200 is established and thus, data transmission and reception is enabled.

A second interface 320 may be determined as another communication mechanism between the second communication 210 and the control unit 250. As an example, the second interface 320 includes an inter-integrated circuit (I2C) mechanism, a synchronization communication mechanism.

The second communication module 210 includes a module recognition unit 211 that recognizes the approach of the first communication module 110 if the first communication module 110 is within a preset distance. As an example, the module recognition unit 211 may be an antenna.

The second communication module 210 further includes a memory unit 220 that stores information on the home appliance 200. The memory unit 220 includes a plurality of memory areas 221, 223 and 225 that are divided in order to store different information.

The memory areas 221, 223 and 225 include a first memory area 221 in which unique information on the home appliance, information on communication, or information on installation of the home appliance is stored, a second memory area 223 in which information generated from the inside of the home appliance 200 is stored, and a third memory area 225 in which information received from the outside as information related to the operation of the home appliance 200 is stored.

In particular, the first memory area 221 stores unique information on the home appliance, for example, information on the type (washing machine, cooking device, refrigerator, and etc.) of the home appliance, information on the model name of the home appliance, a unique ID of the home appliance (even in the case of the same model name, ID may vary), information on a program (software related to an operation course) required for driving the home appliance.

The information on the communication may include information on the first interface 310 or the second interface 320. In addition, the information on the installation of the home appliance may include information on the installation country or region of the home appliance 200.

The second memory area 223 may store information generated while driving the home appliance 200, for example, information on an error or information on an error diagnosis result if the error occurs while driving the home appliance 200, and information on the consumption power of the home appliance.

If the home appliance 200 has an error, the control unit 250 may write information on the error or information on a diagnosis result of the home appliance to the second memory area 223 at a preset time. Thus, the second memory area 223 may be understood as a memory area to which the control unit 250 may write.

On the other hand, if the control unit 250 performs the writing, the terminal 100 may read stored information from the second memory area 223.

Here, the preset time may be any one of immediately when the home appliance 200 has an error, when an operation course is completed if the error occurs while the home appliance 200 performs the operation course, and when the home appliance 200 is turned off.

As an example, when the home appliance 200 has an error and time arrives at the preset time, information that the error has occurred may be displayed on the display unit 206 of the home appliance 200. If the information that the error has occurred is displayed on the display unit 206, it is possible to check information on the error of the home appliance 200 by using the terminal 100.

In particular, if the terminal 100 approaches the home appliance 200 and the module recognition unit 211 recognizes the first communication module 110, the inside information (error occurrence information) may be transmitted from the second memory area 223 to the terminal 100. In this case, the terminal 100 may read the stored inside information from the second memory area 223.

In sum, the information on the error stored in the second memory area 223 may be transmitted to the terminal 100, and the terminal 100 may perform diagnosis on the error. That is, the terminal 100 may be a subject that performs the error diagnosis.

On the other hand, the information on the error diagnosis result may be stored in the second memory area 223. In this case, it may be understood that the control unit 250 performs diagnosis on the error and stores a diagnosis result in the second memory area 223. That is, the control unit 250 may be a subject that performs the error diagnosis.

Moreover, the second memory area 223 may include information on power consumed while driving the home appliance 200. The terminal 100 may move to be within a preset distance from the home appliance 200 and read information on the power.

The third memory area 225 may store outside information transmitted from the terminal 100. The outside information includes information on communication configurations relative to the router 400.

In particular, the home appliance 200 may access the router 400 through the third communication module 270. In this case, information required for connecting the third communication module 270 to the router 400 may be received from the terminal 100.

If the terminal 100 moves to be within the preset distance from the home appliance 200, the module recognition unit 211 recognizes the first communication module 110 and information stored in the terminal 100 may be transmitted and stored in the third memory area 225. That is, the terminal 100 may write the information to the third memory area 225.

The control unit 250 may read stored outside information from the third memory area 225. In addition, the read information may be stored in the main memory (not shown) of the home appliance 200. As a result, the third memory area 225 may be understood as a memory area that the control unit 250 may read.

As such, the outside information transmitted from the terminal 100 to the home appliance 200 may be utilized as communication access information for the home appliance 200.

On the other hand, the inside information stored in the second memory area 223 or the outside information stored in the third memory area 225 may be overwritten if new information is generated.

That is, since the inside information or the outside information is information that keeps on being generated over time, existing information is deleted and new information may be stored in the second memory area 223 or the third memory area 225, if new information is generated.

A third interface 330 may be between the control unit 250 and the third communication module 270. As an example, the third interface 330 includes a universal asynchronous receiver transmitter (UART), an asynchronous transmission and reception mechanism.

In addition, a fourth interface 340 may be between the third communication module 270 and the router 400. As an example, the fourth interface 340 includes WiFi.

Figure 4:
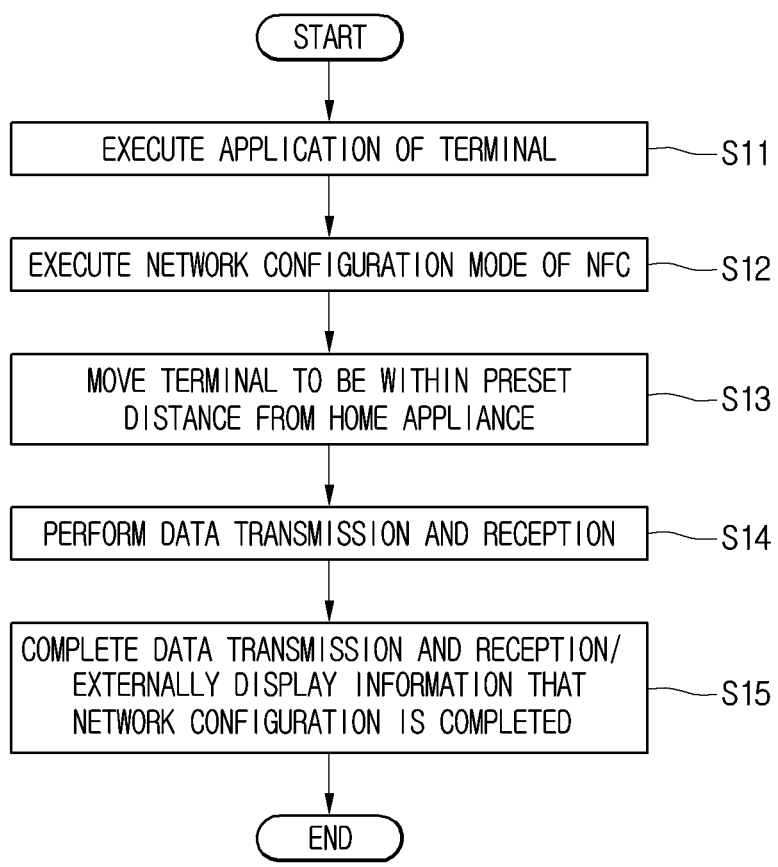
FIG. 4 is a flow chart of a method of controlling a home appliance according to an embodiment of the present invention.

FIG. 4 is a flow chart of a method of controlling a home appliance according to an embodiment of the present invention. A method of configuring a network of a home appliance by using a terminal is described with reference to FIG. 4.

Firstly, the application of the terminal 100 may be executed. The application may be executed after an "NFC mode" of a plurality of communication modes that is defined on the terminal 100 becomes on. If attempting to execute the application while the "NFC mode" is off, the terminal 100 may output a message (screen or voice) indicating that the "NFC mode" needs to be on.

If the application is executed, the terminal 100 may receive the information inside the home appliance 200 or transmit information required for the operation of the home appliance 200 (outside information) to the home appliance 200, in step S11.

In addition, the application includes a plurality of modes in which data may be transmitted or received by using the NFC mechanism. The plurality of modes includes a mode in which data is transmitted or received for the network configuration of the home appliance 200, namely, the configuration of the fourth interface 340 (hereinafter, referred to as a "network configuration mode").

If the network configuration mode is executed, forms in which the ID, communication security mechanism and password of the router 400 may be inputted are displayed on the terminal display unit 101. The ID and password of the router 400 may be an ID and a password that are pre-designated to use WiFi.

In addition, a box that enables a user to select one of a plurality of communication mechanisms may be displayed on the terminal display unit 101.

As an example, selecting one of WEP, WPA, WPA2, and OPEN as a communication security mechanism may be displayed on the terminal display unit 101. Here, the OPEN means open-type communication. A user may select one of the displayed communication security mechanisms in step S12.

While the network configuration mode is executed, a user may move the terminal 100 to be within a preset distance from the home appliance 200 so that the module recognition unit 211 may recognize the first communication module 110. That is, the terminal may be tagged to the home appliance 200 in step S13.

If the module recognition unit 211 recognizes the first communication module 110, data may be transmitted from the terminal 100 to the home appliance 200. That is, the terminal may write the data to the second communication module 210. On the other hand, the transmitted data includes WiFi configuration data for connecting to the fourth interface 340.

While the WiFi configuration data is transmitted, information on the progress of data transmission or reception may be displayed on the display unit 206 of the home appliance 200 or on the terminal display unit 101, in step S14.

If the transmission of the data is completed, information representing that the transmission of the data is completed may be externally displayed. As an example, a completion message may be displayed on the display unit 206 of the home appliance 200 or the terminal display unit 101 or a beep may be externally outputted.

The home appliance 200 attempts to access the router 400 through the third communication module 270. In addition, if the connection between the third communication module 270 and the router 400 is successful, network configuration completion information may be sound-outputted or screen-outputted through the display unit 206 of the home appliance 200 or the terminal display unit 101.

A method of configuring a network by using a terminal is described below in detail with reference to FIG. 5.

Figure 5:
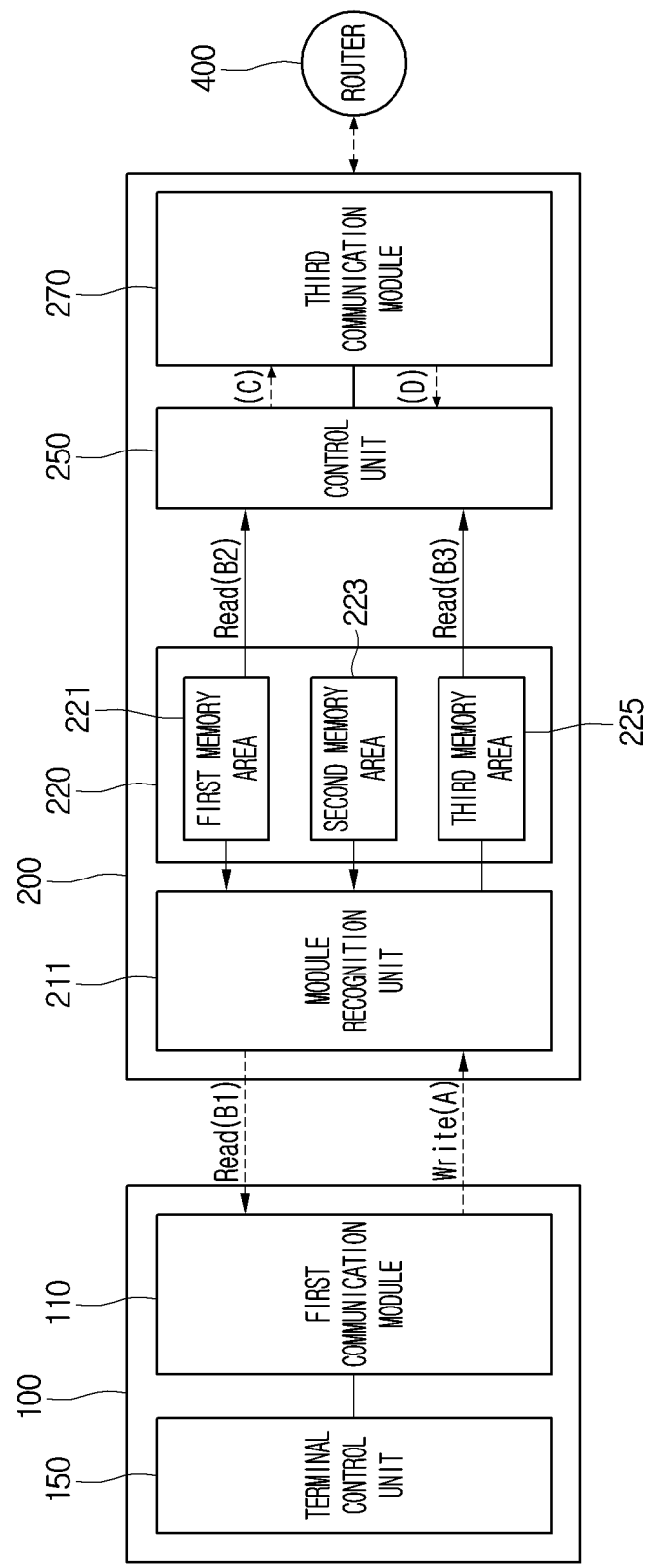
FIG. 5 is a block diagram showing how communication access information on a home appliance is transmitted from a terminal, according to an embodiment of the present invention.

FIG. 5 is a block diagram of how communication access information on a home appliance is transmitted from a terminal, according to an embodiment of the present invention. FIG. 5 shows how information on a network configuration of the home appliance 200 is transmitted from the terminal 100 to the home appliance 200.

As described in FIG. 4, If the application of the terminal 100 is executed, the ID, password and communication security mechanism of the router 400 are entered and the terminal 100 is tagged to the home appliance 200, the information on the network configuration (hereinafter, referred to as "network configuration information") is transmitted from the terminal 100 to the home appliance 200.

Here, the network configuration information may include information to be used when the home appliance 200 connects with the router 400 through the fourth interface 340, and information on the ID, password and communication security mechanism of the router 400 that are inputted to the terminal 100.

In particular, the terminal 100 reads unique information on the home appliance 200 stored in the first memory area 221, and communication information or installation information (hereinafter, referred to as "unique information") that is related to the first and second interfaces 310 and 320. In this process, the terminal 100 checks whether the home appliance 200 is a home appliance suitable for communication, in operation Read (B1).

In addition, the terminal 100 writes the network configuration information together with verification information to the third memory area 225. After writing, the terminal 100 again reads the verification information from the third memory area 225 to complete the writing, in operation Write (A).

The control unit 250 checks whether the second communication module 210 is in an NFC readable mode. If the second communication module 210 is in the NFC readable mode, the control unit 250 reads the unique information on the home appliance stored in the first memory area 221 and checks whether communication is possible, in operation Read (B2).

In addition, control unit 250 reads the network configuration information stored in the third memory area 225 together with the verification information to complete reading, in operation Read (B3).

The control unit 250 transmits the read network configuration information to the third communication module 270.

If the third communication module 270 receives the network configuration information, it may transmit an acknowledgement signal for the reception to the control unit 250. In addition, the third communication module 270 attempts to access the router 400 based on the network configuration information.

If the third communication module 270 accesses the router 400, it may transmit an access completion signal or a network configuration completion signal to the control unit 250.

In addition, the control unit 250 may display, on the display unit 206, a message that an access is completed or a network configuration is completed. Also, the message may also be displayed on the terminal display unit 101.

If the communication module 270 fails to access the router 400, an access failure signal may be transmitted to the control unit 250 in operation (D).

On the other hand, the terminal 100 is configured to be able to access a specific router, for WiFi connection.

When the terminal 100 transmits network configuration information to the home appliance 200, the network configuration information may be information on the same router as a router to which the terminal 100 is connected, or information on a different router from a router to which the terminal 100 is connected.

That is, if a router (a first router) to which the terminal 100 is connected is suitable for connecting the home appliance 200, namely, if the home appliance 200 is located within an area where the router may communicate, the terminal 100 may transmit, to the home appliance 200, information on a router that is connected to the terminal 100.

On the contrary, if a router (a first router) to which the terminal 100 is connected is not suitable for connecting the home appliance 200, namely, if the home appliance 200 is not located within an area where the router may communicate, the terminal 100 may transmit, to the home appliance 200, configuration information on another router (a second router) that is not connected to the terminal 100.

As such, since the terminal 100 may selectively transmit information on a router suitable for communication with the home appliance 200, the communication connection of the home appliance 200 may be easy and communication reliability may be enhanced.

On the other hand, when the terminal 100 is tagged to the home appliance 200, a control method may vary depending on whether the home appliance 200 is turned on or off.

Irrespective of whether the home appliance 200 is turned on or off, the terminal 100 may transmit the network configuration information to the home appliance 200, namely, write the information to the second communication module 210. In this case, the second communication module 210 may be driven by standby power provided by the home appliance 200.

When the home appliance 200 is turned on and the network configuration information is written to the second communication module 210, the control unit 250 may read information stored in the second communication module 210 and transmit the network configuration information to the third communication module 270, according to the processes described in FIG. 5.

On the contrary, when the home appliance 200 is turned off and the network configuration information is written to the second communication module 210, the control unit 250 is in a standby state until the home appliance 200 is turned on. In addition, if the home appliance 200 is turned on, the network configuration information may be read and transmitted to the third communication module 270.

Due to such a method, the transmission and reception of data may be reliably implemented.

Figure 6:
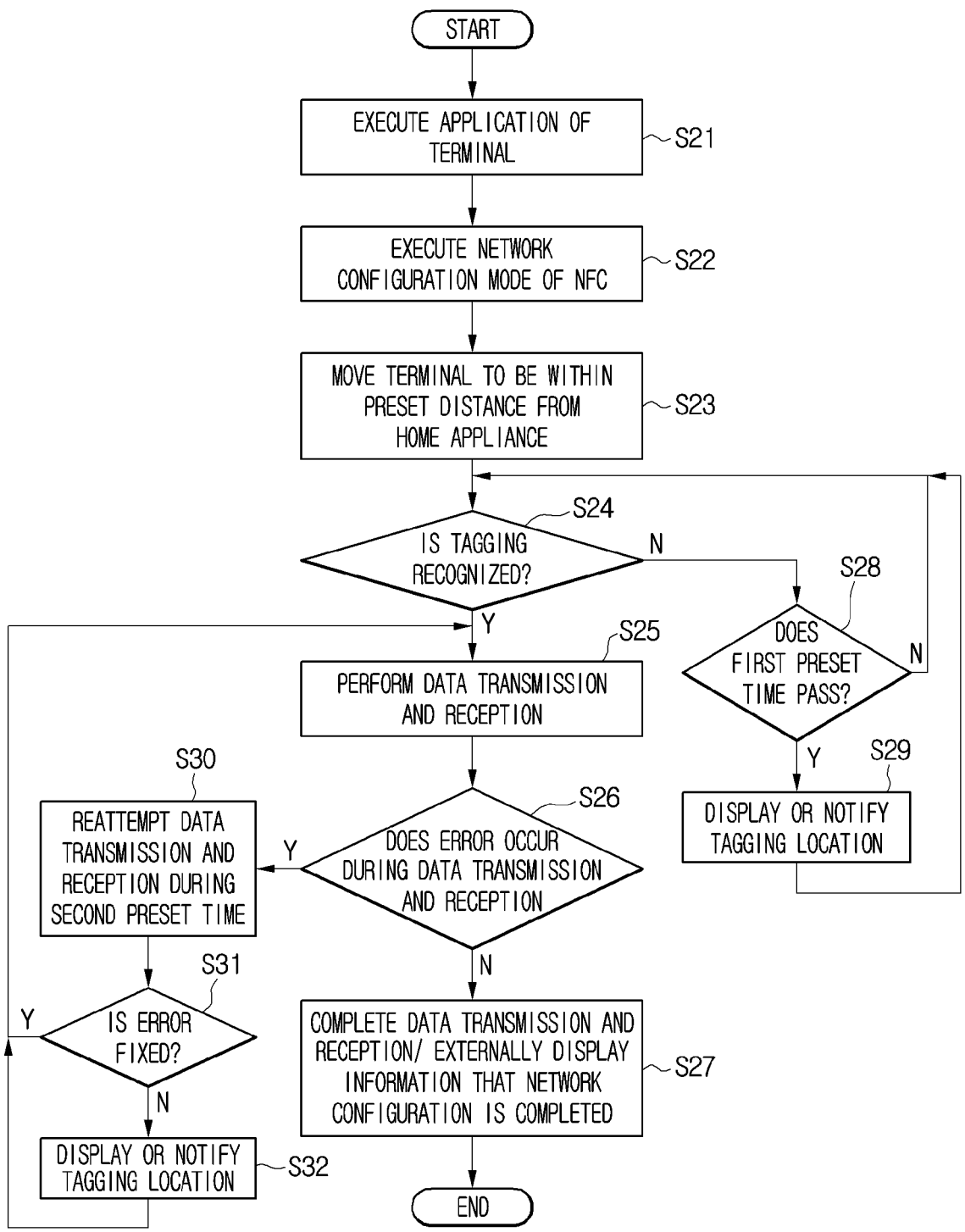
FIG. 6 is a flow chart of a method of controlling a home appliance according to another embodiment of the present invention.

FIG. 6 is a flow chart of a method of controlling a home appliance according to another embodiment of the present invention. A control method of when an error occurs while a terminal is tagged to a home appliance is described with reference to FIG. 6.

Firstly, while an NFC mode of a plurality of communication modes that the terminal has is ON, the application of the terminal 100 may be executed.

If the application is executed, the terminal 100 may receive inside information on the home appliance 200, or transmit, to the home appliance 200, information required for the operation of the home appliance 200 (outside information), in step S21.

In addition, if the application is executed, it is possible to execute the network configuration mode of NFC, in step S22.

While the network configuration mode is executed, the terminal 100 may move to be within a preset distance from the home appliance 200 and may be tagged to the home appliance 200, in step S23.

If the tagging of the terminal 100 is recognized, the transmission or reception of data is performed according to the network configuration mode, in steps S24 and S25.

While the tagging of the terminal 100 is performed and thus, the transmission or reception of data is performed, whether an error occurs is recognized, step S26. Here, the term "error" may be understood to be that the first communication module 110 and the second communication module 210 are in a state where communication is impossible or limited, for example, that the terminal 100 is not within a preset distance from the home appliance 200.

If the error does not occur, the transmission or reception of data is continuously performed and completed and thus, completion information may be externally displayed. As an example, the completion information may be displayed on the display unit of the terminal 100 or the home appliance 200, in steps S26 and S27.

On the contrary, if the tagging of the terminal 100 is not recognized in step S24, it is recognized whether a first preset time passes. The first preset time may be about 10 seconds as an example. That is, the recognition of tagging is determined for the preset time after the specific data transmission and reception mode is executed, in step S28.

If the preset time passes, a message that guides a tagging location may be screen-outputted on the display unit of the terminal 100 or the home appliance 200 or may be voice-outputted. As an example, it is possible to display a text or voice message such as "please put your terminal on a correct location", in step S29.

On the other hand, if an error occurs during the transmission and reception of data in step S26, the transmission and reception of data is reattempted for a preset time. Here, the preset time may be about three seconds, as an example, in step S30.

After the second preset time, it is recognized whether an error is fixed, in step S31. If the error is fixed, steps after step S25 are again performed. On the contrary, if the error is not fixed, a message that guides a tagging location may be screen-outputted on the display unit of the terminal 100 or the home appliance 200 or may be voice-outputted in step S32.

As such, if an error occurs in a process where the terminal 100 is tagged to the home appliance 200 or in a process where the terminal 100 transmits or receives data after the recognition of tagging, it is possible to easily transmit or receive data according to a network configuration mode by externally displaying the fact that an error occurred and guiding a tagging location to a user.

According to proposed embodiments, since a home appliance is connected to a terminal to be able to communicate by using an NFC technology and it is possible to configure a communication environment of the home appliance by using the terminal, the usage convenience of the home appliance may increase.

In particular, it is possible to easily access a specific router by receiving, from the terminal, information for configuring WiFi.

In addition, since the home appliance may communicate with the terminal through an NFC communication mechanism, there is no need for a separate configuration for communication between devices and thus, additional costs for configuring a communication environment decrease.

In addition, since an NFC communication module is provided with a memory unit in which memory areas for storing information generated from the inside of the home appliance and information received from the outside of the home appliance are separately configured, it is possible to easily transmit and receive specific data.

What is claimed is:

1. A home appliance comprising:
   a first module to communicate with a communication module of a terminal;
   a second module to communicate with a router; and
   a control unit to control a communication connection between the second module and the router by using information stored in the first module,
   wherein the first module comprises:
   a module recognition unit to recognize whether the communication module of the terminal is within a preset distance; and
   a memory unit to store network configuration information to be used by the control unit when the second module accesses the router,
   wherein if the module recognition unit recognizes that the communication module of the terminal is within a preset distance, the terminal writes the network configuration information to the first module irrespective of whether the home appliance is turned on or off, the first module being driven by stand by power by the home appliance,
   wherein if the home appliance is turned on and the network configuration information is written to the first module by the terminal, the control unit reads the network configuration information from the first module and transmits the network configuration information to the second module, and
   wherein if the home appliance is turned off and the network configuration information is written to the first module by the terminal, the control unit is in a standby state until the home appliance is turned on, thereafter if the home appliance is turned on, the control unit reads the network configuration information from the first module and transmits to the second module.

2. The home appliance of claim 1, wherein the first module includes a near field communication (NFC) module.

3. The home appliance of claim 2, wherein the control unit controls the first module so that the terminal reads unique information on the home appliance or information on communication or write the network configuration information to the first module.

4. The home appliance of claim 2, wherein the control unit reads the network configuration information from the first module.

5. The home appliance of claim 1, wherein the second module includes a WiFi modem and the control unit transmits the network configuration information to the second module.

6. The home appliance of claim 5, further comprising a display unit, wherein the control unit displays on the display unit information on a connection result between the second module and the router.

7. The home appliance of claim 1, wherein a communication mechanism between the first module and the control unit is an inter integrated circuit (I2C) and a communication mechanism between the second module and the control unit is a universal asynchronous receiver transmitter (UART).

8. The home appliance of claim 1, wherein the network configuration information includes an identification (ID) and password of the router.

9. The home appliance of claim 8, wherein the terminal is accessible through a first router and the control unit communicates with the second module, to access information through the first router.

10. The home appliance of claim 8, wherein the terminal is accessible through a first router, and the control unit communicates with the second module, to access information through a second router.

11. The home appliance of claim 1, wherein the network configuration information includes information of a communication security mechanism, and
   one of wired equivalent privacy (WEP), WiFi protected access (WPA), WPA2 and OPEN in the communication security mechanisms is displayed on a display unit of the terminal to be able to be selected.

12. The home appliance of claim 1, wherein a data transmission and reception mode for a connection between the second module and a router is displayed on a display unit of the terminal to be able to be selected if an application stored in the terminal is executed.

13. The home appliance of claim 1, wherein the memory unit comprises:
   a first area to store unique information, communication information or installation information on the home appliance;
   a second memory area to store error information on the home appliance, information on an error diagnosis result or information on consumption power of the home appliance; and
   a third memory area to store information on configuring communication for a router of the home appliance.

14. A method of controlling a home appliance, the method comprising:
   executing an application of a home appliance and executing a network configuration mode of near field communication (NFC);
   tagging a terminal to the home appliance for data transmission or reception;
   writing, by the terminal, network configuration information to a first module of the home appliance if the tagging is performed, and reading, by a control unit of the home appliance, the network configuration information from the first module; and
   transmitting, by the control unit of the home appliance, the network configuration information read from the first module, to a router,
   wherein the outputting of the guide information comprises:
      outputting the guide information after the first preset time passes, if an error occurs due to failure of the tagging; and
      outputting the guide information after a second preset time shorter than the first preset time passes, if an error occurs during the data transmission or reception.

15. The method of claim 14, wherein the transmitting of the network configuration information to the router comprises:
   transmitting the network configuration information to a second module of the home appliance; and
   communicably connecting the second module of the home appliance to the router based on the network configuration information.

16. The method of claim 14, further comprising outputting guide information by the home appliance or the terminal on a location of the tagging after a preset time passes, if an error in the data transmission or reception occurs.

* * * * *